(12) United States Patent
Carling

(10) Patent No.: US 6,562,414 B2
(45) Date of Patent: May 13, 2003

(54) METHOD OF COATING POLYOLEFIN FLOOR TILE

(75) Inventor: Jason D. Carling, West Jordan, UT (US)

(73) Assignee: Sport Court, Inc., Salt Lake City, UT (US)

( * ) Notice: Subject to any disclaimer, the term of this patent is extended or adjusted under 35 U.S.C. 154(b) by 0 days.

(21) Appl. No.: 09/975,715

(22) Filed: Oct. 10, 2001

(65) Prior Publication Data

US 2003/0068447 A1 Apr. 10, 2003

(51) Int. Cl.$^7$ .................................................. C08F 2/46
(52) U.S. Cl. ........................ 427/487; 427/299; 427/314; 427/319; 427/331; 427/372.2; 427/402; 427/407.1; 427/408; 427/492; 427/493; 427/508; 427/532; 427/535; 427/540; 427/553; 427/580
(58) Field of Search .................. 427/457, 487, 427/492, 493, 508, 532, 535, 540, 553, 580, 299, 314, 319, 331, 372.2, 402, 407.1, 408

(56) References Cited

U.S. PATENT DOCUMENTS

| | | | |
|---|---|---|---|
| 3,937,861 A | 2/1976 | Zuckerman et al. | 442/148 |
| 4,008,352 A | 2/1977 | Dawes et al. | 428/476.9 |
| 4,386,138 A | 5/1983 | Arbit | 428/520 |
| 4,419,382 A | 12/1983 | Sliemers et al. | 427/488 |
| 4,559,250 A * | 12/1985 | Paige | 15/215 |
| 4,930,286 A | 6/1990 | Kotler | 52/177 |
| 5,387,842 A | 2/1995 | Roth et al. | 315/111.21 |
| 5,403,453 A | 4/1995 | Roth et al. | 204/164 |
| 5,414,324 A | 5/1995 | Roth et al. | 315/111.21 |
| 5,456,972 A | 10/1995 | Roth et al. | 442/301 |
| 5,462,771 A | 10/1995 | Motoki et al. | 427/537 |
| 5,466,424 A | 11/1995 | Kusano et al. | 422/186.05 |
| 5,502,148 A | 3/1996 | Hentschel et al. | 528/60 |
| 5,518,799 A | 5/1996 | Finestone et al. | 428/137 |
| 5,567,490 A | 10/1996 | Papazian et al. | 428/34.4 |
| 5,573,715 A | 11/1996 | Adams et al. | 264/1.36 |
| 5,679,385 A | 10/1997 | Adams et al. | 425/174.4 |
| 5,693,390 A | 12/1997 | Inagaki et al. | 428/35.7 |
| 5,695,064 A | 12/1997 | Huang et al. | 206/554 |
| 5,803,973 A | 9/1998 | Szczyrbowski et al. | 118/723 ER |
| 5,910,401 A | 6/1999 | Anderson et al. | 430/533 |
| 6,231,939 B1 * | 5/2001 | Shaw et al. | 428/213 |
| 6,436,159 B1 * | 8/2002 | Safta et al. | 106/204.01 |

* cited by examiner

*Primary Examiner*—Bernard Pianalto
(74) *Attorney, Agent, or Firm*—Thorpe North & Western, LLP.

(57) ABSTRACT

A system for applying a polyurethane coating to a polyolefin floor tile, comprising a conveyor for moving the floor tile past a plurality of treatment devices, including a heater, a plasma generator, an applicator, and an ultraviolet light system. The heater and plasma generator increase the energy of the top surface of the floor tile, and the applicator applies a liquid polyurethane to the top surface while in the energized state. The ultraviolet light system then exposes the polyurethane to ultraviolet light to at least partially cure it.

14 Claims, 3 Drawing Sheets

METHOD OF COATING POLYOLEFIN FLOOR TILE

BACKGROUND OF THE INVENTION

1. Field of the Invention.

The present invention relates to the protective coating of polyolefin floor tiles. More particularly, the present invention relates to a system for applying a polyurethane coating to a polyolefin floor tile in a factory environment.

2. Related Art.

The term polyolefin refers to any of the largest genus of thermoplastics, which are polymers of simple olefins such as ethylene, propylene, butene, isoprene, and pentene, and copolymers thereof. Two of the more important members of this group are polyethylene and polypropylene, which together account for just under half of all thermoplastics produced in the United States.

In recent years polyolefins and other polymers have been used to create resilient flooring materials for use in athletic arenas such as basketball courts, tennis and racquetball courts, and so forth. An example of such a tile is shown in FIG. 1. These tiles vary in size, and may range from about 10" to 12" square by ⅜" to ½" thick. Because they are typically configured as interlocking tiles having approximately the same size as traditional floor tiles, these flooring materials are easy to install. However, because of the polymer construction, the resulting floor surface is relatively susceptible to scratches and abrasion, and tends to lose its glossy appearance over time. This is a problem for athletic floors where an attractive, durable, and long lasting high gloss surface is desired.

To solve these problems, some sort of coating of the floor tiles is desirable. However, due to the chemical structure and simplicity of polyolefins and other polymers, their surfaces are generally resistant to any kind of permanent coating or decorating. Polyolefins, for example, are generally characterized by a nonpolar, nonporous, low-energy surface structure that does not easily bond to inks, lacquers, and other polymers without special oxidative pretreatment. The resistance of polyolefins to coating or decorating is especially problematic when the substance to be bonded is another polymer such as polyurethane. Polyurethane is well known and has many uses in biomedical and other applications. It's suitability to these applications is due in large part to its very low reactivity: polyurethane is very inert, and resists reaction with body fluids and other organic and inorganic chemicals. Polyurethane would be an excellent coating for a polyolefin floor material because it can be made to have a scratch and abrasion resistant surface and a long lasting high gloss appearance.

In order to sufficiently bond a coating or decoration to a polyolefin or other polymer, the surface is ordinarily treated in some way, or a secondary adhesion-promoting layer is added to improve bonding. There are a number of common methods for doing this, including the use of heat and pressure, chemical treatment, electron bombardment, flame treatment, and plasma or corona treatment.

The application of pressure and temperature together can cause some coatings and decorations to bond to a polymer surface. An example of this method is hot stamping, which involves the use of a heated applicator and a special ink held by a foil backing. The ink is forced via heat and pressure to transfer to the new substrate. This method works quite well with some small sized parts and certain families of plastics. However, this technique is very sensitive to the size and shape of the objects to be treated. It generally only works well with small or flat surfaces that can be stamped or rolled. Large or convoluted shapes or surfaces that have complex geometric structure or texture are virtually untreatable using heat and pressure. Additionally, this technology requires specialized, stationary equipment. A preferred method of surface treatment will allow the treatment of large or oddly shaped parts and those with textured surfaces in addition to surfaces that may be stamped or rolled, and may be accomplished with small, simple equipment that may be easily moved.

Chemical treatment is of two kinds: chemical abrasion, and the application of a secondary 'primer' layer. Chemical abrasion involves the activation of the polymer surface with a solvent, and is typically used with polar materials. The solvent chemically 'etches' the surface of the polymer, creating an abraded and/or chemically changed surface that is more conducive to bonding. Examples of chemical abrasion are the application of acetone or MEK to acrylic, styrene, PVC, and ABS. The use of a secondary primer layer involves the application of a material that, because of its own high level of chemical activity, will bond to both the polymer substrate and the coating or decoration. An example of such a primer would be a chlorinated compound held in a solvent emulsion.

There are a number of significant drawbacks to chemical treatment. First, if too strong of a chemical solvent is used, or exposure is too prolonged, the polymer will soften or dissolve. There are also significant dangers posed by human exposure to chemical solvents, and the introduction of these chemicals into the environment. A preferred method of increasing the surface energy of polymers will increase the surface energy enough to promote bonding, while avoiding the possibility of dissolution of the polymer itself, and prevent or limit human and environmental exposure to harmful chemicals.

Electron bombardment involves the direction of a beam or 'cloud' of electrons onto a plastic surface to interact with the surface. The free electrons in the cloud or beam act to knock existing electrons out of their orbital positions in the polymer molecules, creating locations on the surface where other chemicals may bond. The electron beam may also cross-link or cut some polymer chains, creating additional locations for chemical bonding. This process is carried out in a vacuum environment to minimize the effects of air molecules. The automotive industry commonly uses electron bombardment to activate bumper fascias and other large parts.

Electron bombardment is a very expensive method of polymer activation because it requires the placement of the object into a closed vacuum chamber. Moreover, with this method some areas of the surface will receive less treatment than others. A preferred method of polymer surface activation will treat all areas of a surface equally, will have a reasonable cost, and will not require the placement of the item into a vacuum chamber or other device of a fixed size, allowing the treatment of objects of variable size and shape in a normal human environment.

Flame treatment involves the brief application of a flame or heat to the polymer surface. This oxidizes a thin surface layer of the material, creating highly active surface molecules that will bond with inks, dyes and other coatings. However, flame or heat treatment alone does not always produce good results. Many polymers have difficulty withstanding the addition of heat without deforming or changing in clarity or physical structure. If excessive heat is applied, the material may soften or warp. Excess heat may also cause accelerated aging by the introduction of heat history to the material. Consequently, when the added heat is kept below a level which prevents these problems, the polymer frequently will not obtain sufficiently increased surface energy to adequately promote bonding. A preferred method of increasing the surface energy in polyolefins and other polymers will increase the surface energy enough to promote bonding, while limiting surface temperature increase to below a level which will deform or significantly damage the material.

Another method of treating a polymer surface to increase its surface energy that is superior in some ways to each of the above described methods is corona or plasma treatment. In the discipline of physics, the term "plasma" describes a partially ionized gas composed of ions, electrons, and neutral species. This state of matter may be produced by either very high temperatures, such as exist in celestial bodies or nuclear explosions, or by strong electric arcs or electromagnetic fields. An electric arc plasma may be produced by a pair of electrodes spaced some suitable distance, facing each other. The electrodes are then given a high voltage charge (AC or DC), which causes electricity to arc across the gap between the electrodes. The distance between the electrodes primarily depends upon the voltage used. This high energy electric arc produces a plasma in the region immediately around the electric arc.

When a plastic surface is exposed to a high energy plasma produced by a high voltage electric arc, the plasma interacts with the surface molecules, increasing their energy through a variety of mechanisms, depending on the specific polymer involved. In some cases, surface hydrogen molecules are removed, leaving behind active bonding sites. Also, crosslinking or scission can occur in the surface molecules, as in electron bombardment. This will change the surface energy of the material, making it easier for a coating to adhere. Oxides may also form on the surface, as in flame treatment, which are easier to bond to than the actual base polymer. These are just a few of the possible chemical mechanisms which are caused by plasma treatment that increase surface energy. The great benefit of using electric arc plasmas is that they are relatively low temperature, and can be used without damage to the surface of polymers and other relatively delicate materials.

In spite of the variety of methods for surface treatment of polyolefins, each method presents drawbacks and/or limitations which reduce their effectiveness.

SUMMARY OF THE INVENTION

It has been recognized that it would be advantageous to develop a floor tile coating system that raises the energy level of the tile surface above what is possible with any one of the prior art treatment methods.

In one aspect, the invention advantageously provides a system for applying a polyurethane coating to a polyolefin floor tile. The system includes a conveyor for moving the floor tile past a number of treatment devices, including a heater, a plasma generator, a first applicator for applying liquid polyurethane, and a first ultraviolet light system. The heater and plasma generator increase the energy of the top surface of the floor tile, and the first applicator then applies a first coating of liquid polyurethane to the top surface of the floor tile while in the energized state. The ultraviolet light system exposes the first coating to ultraviolet light to at least partially cure it.

In accordance with a more detailed aspect of the present invention, the system includes a second applicator, for applying a second coat of liquid polyurethane atop the first coat, and a second ultraviolet light system, configured to at least partially cure the first coat and the second coat of liquid polyurethane, after they have been applied to the tile.

Additional features and advantages of the invention will be apparent from the detailed description which follows, taken in conjunction with the accompanying drawings, which together illustrate, by way of example, features of the invention.

DETAILED DESCRIPTION

Figure 1:
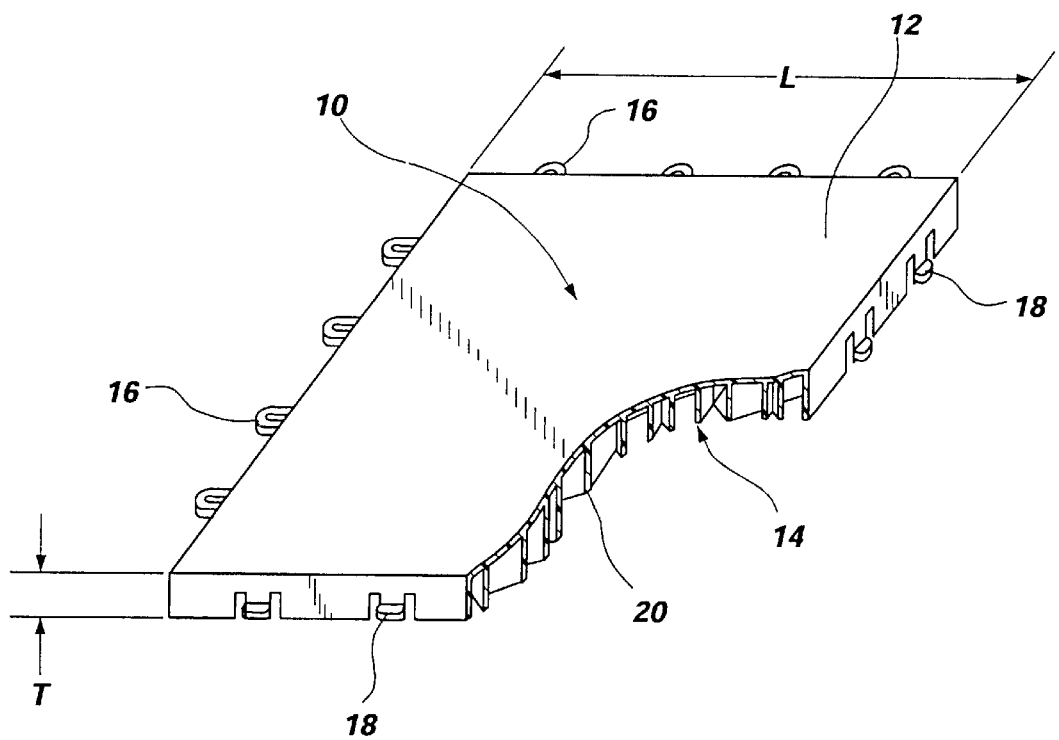
FIG. 1 is a pictorial cut-away representation of a polymeric floor tile provided with a polyurethane coating by means of the system of the present invention.

For the purposes of promoting an understanding of the principles of the invention, reference will now be made to the exemplary embodiments illustrated in the drawings, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Referring now to the drawings, FIG. 1 provides a pictorial cut-away representation of a typical polymeric floor tile, such as is manufactured by Sport Court, Inc. of Salt Lake City, Utah. These floor tiles, designated generally at 10, are typically square in plan, with a thickness T that is substantially less than the plan dimension L. A typical Sport Court, Inc. floor tile is approximately 10" to 12" square, though other sizes are available, and is ⅜" to ½" thick. These tiles may be made of many suitable thermoplastic polymer materials, including polyolefins such as polypropylene and polyethylene, and other polymers including nylon.

As shown, the top 12 of the tile is a smooth solid surface, whereas the bottom 14 is comprised of a lattice-type structure 20 which gives strength to the tile while keeping its weight low. The solid top and lattice-type bottom structure are integrally formed of the same material so as to be structurally strong. It will be apparent, however, that the invention described herein is not necessarily limited to floor tiles with a smooth, solid top surface. Tiles having a grid or lattice-type top surface of various configurations may also be coated according to this invention. Likewise, the top surface and lattice-type bottom structure need not be integrally formed.

The floor tiles 10 typically have loops 16 on two adjacent sides, and pins 18 on the two other adjacent sides as shown. To install the floor, a tile 10 is placed with its top 12 facing up, and its bottom 14 on any suitable subfloor, such as concrete. A second tile is then placed parallel to and alongside the first tile, oriented such that the pins 18 of one side of the second tile are adjacent the loops 16 of a corresponding side of the second tile. The pins 18 of the second tile are then snapped into the loops 16 of the first tile such that the sides of the two tiles are fitted snugly together. This process is continued until an entire floor is in place. Partial tiles, edge tiles, transitional tiles, and other special pieces are also available to allow completion of a floor installation in a variety of conditions.

Figure 3:
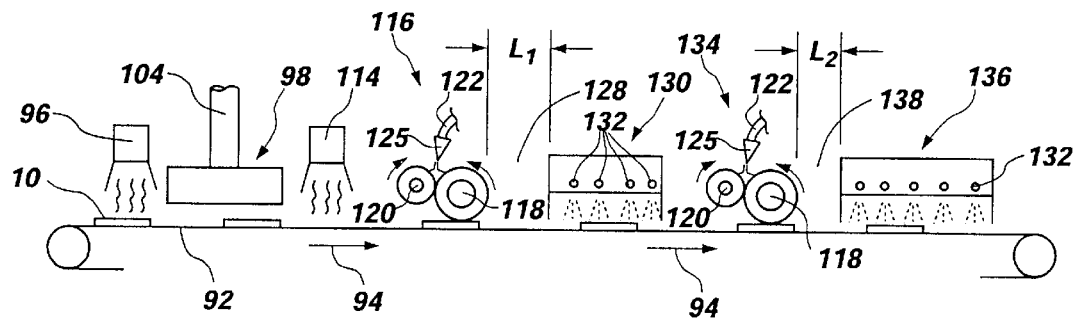
FIG. 3 is a semi-schematic diagram of an assembly line manufacturing process for producing coated floor tiles according to the present invention.

FIG. 3 shows a semi-schematic diagram of an assembly line manufacturing system for coating floor tiles according to the present invention. An untreated floor tile 10 is placed on a transport means 92 such as a conveyor belt, and is moved in a downstream direction, represented by arrows 94, past several treatment devices. As will be appreciated, the conveying speed of the conveyor belt may be adjusted depending upon spacing and operation of the treatment devices, or the spacing and operation of the treatment devices may determined based upon the conveying speed. The conveyor belt and corresponding treatment devices may be wide enough to allow the placement of 2 to 4 tiles side by side for simultaneous treatment.

Upon placement upon the conveyor belt 92, the tile 10 initially approaches a first heater 96, disposed adjacent to the conveyor, and configured to heat the top surface 12 of the floor tile to an elevated temperature. The elevated temperature should not be so-high as to melt, warp, or substantially-damage the tile. In one embodiment, configured for use with polypropylene tiles, the first heater 96 is designed to raise the temperature of the top surface of the floor tile from approximately room temperature to above 120° F. Flames could also be used for heating the tiles. In order to compensate for normal radiant cooling that will take place during the time interval between heating of the tile and application of the polyurethane coating, the inventor has found it desirable to raise the temperature of the tile to about 145° F., so that the tile will have a temperature of about 120° F. or higher when the polyurethane is actually applied.

Figure 4:
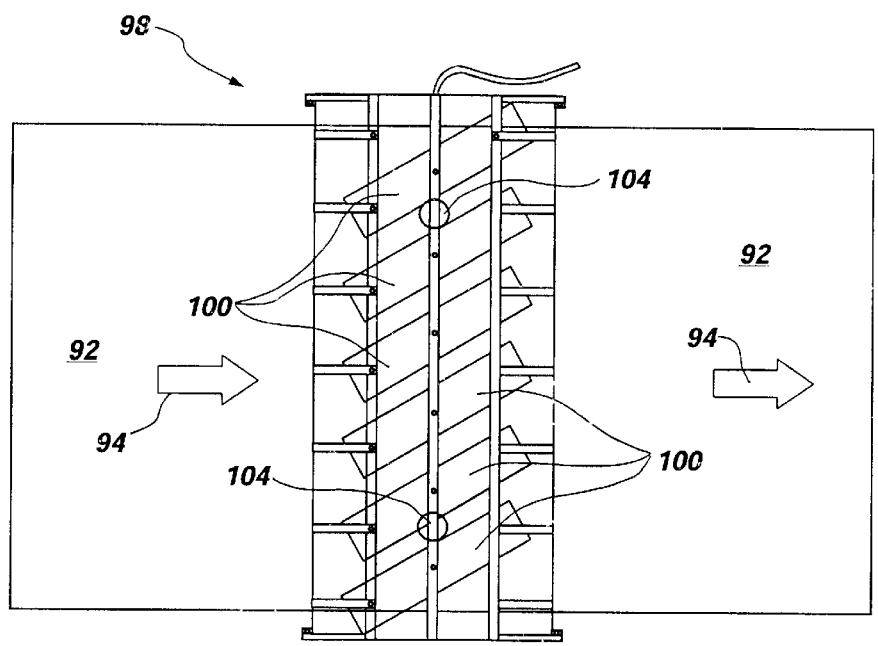
FIG. 4 is a plan view of an indirect electrode plasma generator suitable for use in conjunction with the system of the present invention.
Figure 5:
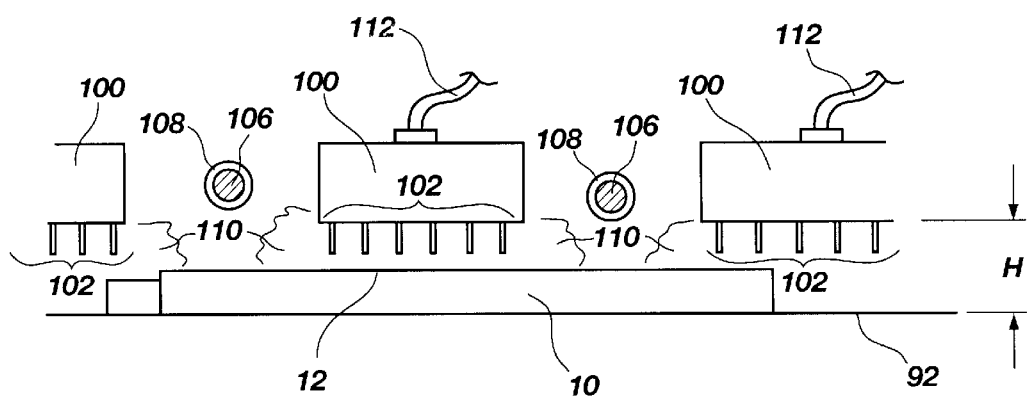
FIG. 5 is a cross-sectional view of a portion of the electrode assembly of the plasma generator of FIG. 4.

Following the first heater 96, the tile 10 then enters a plasma generator 98, disposed downstream of the first heater and adjacent to the conveyor 92. FIG. 4 is a plan view of an indirect electrode plasma generator suitable for use in conjunction with the system of the present invention, manufactured by Lectro Engineering Company of St. Louis, Mo. FIG. 5 is a cross-sectional view of a portion of the electrode assembly of the plasma generator of FIG. 4.

The plasma generator 98 is configured to expose the heated top surface 12 of the floor tile 10 to an electric arc plasma. The plasma generator 98 includes a plurality of electrode bars 100 disposed above the conveyor 92 and aligned parallel to each other, each electrode bar having a regular grid of electrode pins 102 extending downwardly from its bottom surface, toward the conveyor. An active exhaust system (not shown) with one or more exhaust conduits 104 is disposed above the electrode assembly to draw off ozone ($O_3$) which is a natural byproduct of an electric arc plasma.

Disposed between each pair of electrode bars 100, and running parallel to them, is a grounding wire 106. The grounding wires may be a copper wire, and, in the embodiment shown in FIG. 5, are encased in a Pyrex tube 108. This is done for two reasons. First, the tube helps keep the electrode from corroding or oxidizing due to the plasma. Second, it provides enough insulation that the pin electrodes do not arc, but maintain a plasma "cloud" 110.

Electrical energy is pumped into the electrode bars 100 through power lines 112, and produces the plasma cloud 110 as it exits the electrode pins 102 and travels to the grounding wire 106. The height H of the electrode bars 100 (and hence, of the pins 102) above the conveyor 92 is adjustable so as to allow accurate adjustment of the plasma exposure for a given conveyor speed. Adjustment of the height of the electrode pins above the conveyor will affect the intensity of the plasma field which comes into contact with the floor tiles.

As depicted in FIG. 4, the electrode bars 100 are oriented at an angle to the conveyor belt 92. This orientation is intended to compensate for local variations in the intensity of the plasma field. It will be apparent that the intensity of the plasma field will vary, for example, being lower and more variable in the regions between the electrode bars, and higher and more consistent in the region directly below any particular electrode bar. Accordingly, to help ensure that all surfaces of a tile receive the same level of plasma treatment or exposure, the electrode groups are arranged at an angle to allow any given spot on any tile passing through the plasma treatment machine to pass through each type of intensity region.

With the belt 92 moving at a constant conveyor speed, the entire top surface 12 of the floor tile 10 passing through the plasma field will be approximately uniformly activated. It is desirable to expose the top surface of the floor tile to plasma energy sufficient to raise the dyne level of the surface to at least 72, in combination with heating of the tile. The inventor has found that this energy level provides for complete wetting of the polymer surface, and promotes strong adhesion of the polyurethane coating.

After passing through the plasma generator 98, the activated floor tile 10, is exposed to a second heater 114, which helps maintain its temperature in the desired range, preferably above about 120° F. The tile then moves immediately without stopping into the first polyurethane coating applicator 116, disposed downstream of the second heater and adjacent to the conveyor 92. The first coating applicator is configured to roll a first layer (82 in FIG. 2) of a liquid polyurethane onto the energized top surface 12 of the floor tile as it passes beneath the applicator roller while on the conveyor. As depicted, the first coating applicator is a differential roll coater. These machines are readily commercially available. The first coating applicator 116 includes an applicator roller 118 for directly applying the liquid polyurethane to the tiles, and a smaller "doctor" roller 120, for applying the polyurethane onto the applicator roller and ensuring that the polyurethane is evenly spread out on the applicator roller.

The applicator roller 118 is provided with a resilient roller surface (e.g. 25 durometer), which allows the roller to press against and conform to slight irregularities in the tile surface, such as small dimples, etc., so as to provide better contact of the polyurethane with all parts of the tile surface. One or more polyurethane supply conduits 122 supplies liquid polyurethane through a nozzle 124 to the gap between the doctor roller 120 and the applicator roller 118. A wiper 126 smooths the liquid polyurethane on the doctor roller, and prevents the liquid from dripping onto the conveyor belt below. Excess polyurethane runs to the ends of the rollers and into a sump (not shown), where it is collected and recirculated to the polyurethane supply conduit.

It will be apparent that the liquid polyurethane could be applied in different ways. For example, liquid polyurethane could be sprayed onto the tiles, either automatically or manually, using a spray apparatus. Alternatively, rather than an automatic roller applicator, a worker with a hand-held roller apparatus or other means known in the art for applying polyurethane coatings, may manually apply the coating to the activated floor tiles, either continuously or in batches. It will be apparent that other alternatives are also possible.

The first polyurethane coat 82 is preferably a one-part all-solids (i.e. non-solvent based) UV-cured aliphatic polyurethane. This type of polyurethane is well known by those skilled in the art, and is readily commercially available from paint, resin and coating suppliers.

It will be appreciated that the specific chemical make-up of the first polyurethane coat 82 may be adjusted for optimum adhesion and other properties, depending on the specific polymer substrate and other parameters of the chosen embodiment, and environmental, use, and other factors. For example, various commercially available additives may be included in the polyurethane. Silicone may be added (0 to 10%) to make the polyurethane hydrophobic, improve tape release and ease of maintenance, and to help prevent water from interfering with the bond between the polyurethane and the tile surface, or another polyurethane coating. Teflon (0 to 10%) (aka polytetrafluoroethylene or PTFE) may be added as particles which range from 0–25 microns in size. Teflon helps improve wear, scratch, scruff, mar and abrasion resistance, and also modifies the friction and hydrophobic characteristics of the coating.

Aluminum oxide powder (0–50 microns in size) may be added to improve wear, scratch, scruff, mar and abrasion resistance, and to provide increased friction. From 0–40% Aluminum oxide may be added depending on particle size and physical properties required. Iron oxide powder (0 to 5%, 0–25 microns in size) may be added to provide improved wear resistance, increased friction, and changes in static conductivity.

Hollow or solid glass beads (0–25 microns in size) may be added to improve wear, scratch, scruff, mar and abrasion resistance, and to provide modified friction and hydrophobic properties. Proportions may be from 0–10%, depending on size and physical properties required. Glass beads also help reflect and transmit UV light through the entire thickness of the polyurethane coating, which helps cure the material. If aluminum oxide is added, as discussed above, and is clean, it can provide a similar cure-enhancing reflective effect.

Pigments may also be mixed into the polyurethane to provide coloration, opacity, and the desired aesthetic appearance of the coating. It will be apparent that there are hundreds of different pigments which may be used, depending on which color is desired. It will also be apparent that the inclusion of pigments will increase the opacity of the polyurethane, and thus may slow the UV curing process.

The first polyurethane coating 82 is applied in a thickness of from 0.0005" to 0.002". In many cases, the inventors employ a coating thickness of 0.0015". It will also be apparent that other forms of polyurethane, such as water based or water borne polyurethanes, aromatic polyurethanes, etc., may also be used in alternative embodiments of the invention. Aromatic polyurethanes present the characteristic of gradually turning yellow or amber with age. It will also be apparent that other chemical types of coatings may also be used, in addition to polyurethane. For example urethane acrylates, urethane methacrylates, epoxy acrylates and epoxy methacrylates may also be applied using the system and method of the present invention. These coatings may be desirable for their scratch, scuff, wear resistance, hardness, and ability to be cured via UV or Electron Beam energy.

Following the first coating applicator 116, the tile 10 travels through a first space 128 between the first coating applicator and a first ultraviolet light system 130. This first space 128 has a length $L_1$ chosen in relation to the speed of the conveyor belt 92, so as to provide a time interval for allowing the first polyurethane coating 82 to flatten-out before exposure to the first ultraviolet light system. When liquid coatings are applied with a roller, the coating may initially have ripples, dimples, and other irregularities in its surface. In order to eliminate these, a brief time interval is needed, sufficient to allow the liquid to assume a naturally flat, smooth surface under the force of gravity. The length of this time interval will depend primarily upon the viscosity of the liquid polyurethane.

After this flattening-out interval, the tile enters the first ultraviolet (UV) light system 130. The first UV light system is configured to at least partially cure the first coat 82 of liquid polyurethane after it has been applied to the tile. This system comprises a plurality of fluorescent UV light tubes 132 which provide light in the UV A, B, C, and V ranges, at an intensity suitable to provide the desired curing. Suitable UV light systems for this application are readily commercially available.

At this stage of the process, it is desirable to only partially cure the first coating, for reasons which will become apparent hereafter. In one illustrative embodiment of the invention, the UV lights 132 of the first UV light system 130 provide light in the range of 200 nm to 400 nm, and are adjustable to selectively provide 125, 200, or 300 watts/linear inch. A suitable power level may be selected in coordination with the speed of the conveyor 92 so as to expose each tile to the appropriate curing energy.

After emerging from the first UV light system 130, the tile encounters a second coating applicator 134, configured to roll a second layer 80 of liquid polyurethane atop the first layer 82. The first and second layers 82 and 80 are shown in cross section in FIG. 2. The second coating applicator 134 is a differential roll coater, like the first coating applicator 116, and operates in the same manner. However, as mentioned above, other alternative polyurethane application methods may be used. The second polyurethane coating, like the first, is preferably a non-solvent-based, UV-cured, aliphatic liquid polyurethane, and is applied in a thickness of from 0.0005" to 0.002". Also, as with the first polyurethane coating, the second coat of liquid polyurethane may include various additives mentioned above.

The inventor generally considers it desirable to make the second coat 80 thinner than the first coat 82. The first coat acts as a sealer, and provides a substantial amount of wear resistance. The second coating is generally harder, and is intended to be a scratch resistant layer. The combination of the first and second coatings in this manner, in combination with a selected combination of additives, if desired, provides a surface that is tailored to have a long lasting and aesthetically pleasing surface. However, both coatings may be the same thickness, or this configuration may be reversed, if desired.

As mentioned above, the first coating 82 is only partially cured before the second coating 80 is applied. This is done for two primary reasons. First, once a UV cured polyurethane is fully cured, it becomes essentially inert, and it is difficult, if not impossible, to get a second coat to firmly adhere to it. Stated differently, it is important for the first coating to include a substantial proportion of uncured liquid polyurethane with which the liquid polyurethane of the second coat may mix. Then, when the second coat and first coat are cured together, the two essentially become one single coat. However, if the first coat is entirely uncured, a significant quantity of it may be pulled off of the tile when it encounters the second coating applicator 134. This will prevent the total thickness of the two coats from being realized.

Between the second coating applicator 134 and a second ultraviolet light system 136 is a second space 138, having a length $L_2$ selected in relation to the conveying speed so as to provide a second time interval to allow the second coating 80 to flatten out before UV curing. This second space 138 is configured similarly to, and provides the same benefits as, the first flattening-out space 128. It should be borne in mind that FIG. 3 is largely symbolic, and not truly pictorial. It is not intended that the relative sizes of spaces 128 and 138 be. represented in the illustration.

After the tile passes through the second flattening-out space 138, it passes into the second ultraviolet light system 136. This system is configured to cure the first and second layers of liquid polyurethane together. The second ultraviolet light system is more extensive than the first, and is designed to more fully cure both coats of polyurethane. This second UV system is designed to expose the tiles to light in the same frequency range as the first UV light system, but, in coordination with the speed of the conveyor, is configured to provide greater energy, so as to completely or nearly completely cure both coats of polyurethane. Those skilled in the art will recognize that an appropriate curing energy may be determined through trial and error, or other methods.

Figure 2:
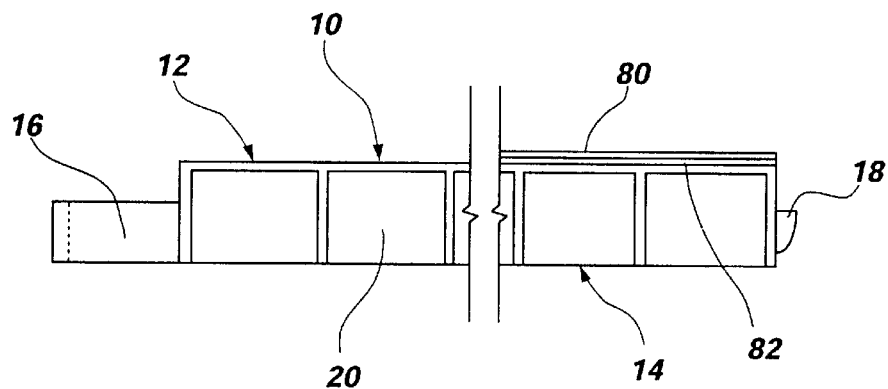
FIG. 2 is a partial cross-sectional view of the polymeric floor tile of FIG. 1.

After UV curing, the completed, coated floor tile finally emerges from the system, and is ready to install. In practice, the tiles may be allowed to cool for a brief time before being packaged for shipment and sale. Shown in FIG. 2 is an enlarged partial cross-sectional view of a polymeric floor tile before and after treatment according to the present invention. In the left half of the figure, the untreated floor-tile 10 has a smooth solid top surface 12, and the integrally formed lattice-type structure 20 on the bottom side 14. On opposing sides of the tile are loops 16 and pins 18 which allow the tiles to be interconnected. As shown in the right half of FIG. 2, following heat and plasma treatment, the top surface 12 is coated with the two polyurethane layers 80 and 82. Due to the plasma treatment, a bonded attachment forms at the interface between the first polyurethane coating and the top surface of the tile.

The system described herein may be advantageously used to coat a wide array of polymers, including polyolefins such as polyethylene and polypropylene, as well as other polymers such as nylon and PVC.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been shown in the drawings and fully described above with particularity and detail in connection with what is presently deemed to be the most practical and preferred embodiment(s) of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims.

What is claimed is:

1. A method of applying a polyurethane coating to a polyolefin floor tile, comprising the steps of:

a) heating a top surface of the floor tile to an elevated temperature which is not so high as to melt, warp, or substantially damage the tile;

b) exposing the top surface of the floor tile to an electric arc plasma, after the aforesaid step of heating, so as to increase the dyne level of said top surface;

c) heating the top surface of the floor tile a second time to an elevated temperature which is not so high as to melt, warp, or substantially damage the tile, after exposing it to the electric arc plasma and before applying a polyurethane coating; and d) applying a polyurethane coating to the top surface of the floor tile while the top surface is both heated and at an increased dyne level.

2. The method of claim 1, further comprising the step of exposing the polyurethane coating to ultraviolet radiation, so as to at least partially cure said coating.

3. The method of claim 2, further comprising the step of allowing a time interval between the step of applying the polyurethane coating and exposing the polyurethane coating to ultraviolet radiation, so as to provide a flattening-out time interval for the coating.

4. The method of claim 1, wherein the step of exposing the top surface of the floor tile to an electric arc plasma further comprises the step of exposing the top surface of the floor tile to an electric arc plasma sufficient to raise the dyne level of the surface to at least about 72.

5. The method of claim 1, wherein at least one of the steps of heating the top surface of the floor tile comprises heating the floor tile to a temperature of at least 120° F.

6. The method of claim 1, wherein the thickness of the polyurethane coating is from 0.0005" to 0.002".

7. The method of claim 1, wherein the polyurethane coating comprises a one-part, all-solids, UV-cured, aliphatic liquid polyurethane.

8. The method of claim 7, wherein the liquid polyurethane includes an addictive selected from the group consisting of: 0–10% silicone; 0–10% Polytetrafluoroethlene having a particle size of 0–25 microns; 0–40% aluminum oxide having a particle size of 0–50 microns; 0–5% iron oxide having a particle size of 0–25 microns; 0–10% glass beads having a size of 0–25 microns; and pigments.

9. The method of claim 1, wherein the step of applying a polyurethane coating to the top surface of the floor tile further comprises:

e) applying a first polyurethane coating to the top surface of the floor tile; and f) applying a second polyurethane coating atop the first polyurethane coating.

10. The method of claim 9, wherein each of the first and second polyurethane coatings comprise a one-part, all-solids, UV-curable, aliphatic liquid polyurethane.

11. The method of claim 10, wherein the liquid polyurethane of each of the first and second polyurethane coatings includes an additive selected from the group consisting of: 0–10% silicone; 0–10% Polytetrafluoroethylene having a particle size of 0–25 microns; 0–40% aluminum oxide having a particle size of 0–50 microns; 0–5% iron oxide having a particle size of 0–25 microns; 0–10% glass beads having a size of 0–25 microns; and pigments.

12. The method of claim 9, wherein the thickness of each of the first and second polyurethane coatings is from 0.0005" to 0.002".

13. The method of claim 9, further comprising the steps of:

g) exposing the first polyurethane coating to ultraviolet radiation, so as to at least partially cure the first coating before applying the second coating; and h) exposing the first and second polyurethane coatings to ultraviolet radiation after application of the second coating, so as to further cure the first coating and at least partially cure the second coating.

14. The method of claim 13, further comprising the steps of:

i) allowing a first time interval between applying the first polyurethane coating and exposing the first polyurethane coating to ultraviolet radiation, so as to provide a flattening-out time interval for the first coating; and j) allowing a second time interval between applying the second polyurethane coating and exposing the first and second coatings to ultraviolet radiation, so as to provide a flattening-out time interval for the second coating.

\* \* \* \* \*